Oct. 4, 1938.  C. C. RICHARD  2,132,244
AUTOMATIC PROGRESSIVE DIE FOR STUD, BOLT, AND SCREW BLANKS
Filed Feb. 18, 1935  12 Sheets-Sheet 1

INVENTOR
Clement C. Richard.
BY
ATTORNEY

Oct. 4, 1938.    C. C. RICHARD    2,132,244
AUTOMATIC PROGRESSIVE DIE FOR STUD, BOLT, AND SCREW BLANKS
Filed Feb. 18, 1935    12 Sheets-Sheet 2

INVENTOR
Clement C. Richard.
BY
ATTORNEY

Oct. 4, 1938.   C. C. RICHARD   2,132,244
AUTOMATIC PROGRESSIVE DIE FOR STUD, BOLT, AND SCREW BLANKS
Filed Feb. 18, 1935   12 Sheets-Sheet 3

INVENTOR
Clement C. Richard.
BY
ATTORNEY

Oct. 4, 1938.

C. C. RICHARD 2,132,244

AUTOMATIC PROGRESSIVE DIE FOR STUD, BOLT, AND SCREW BLANKS

Filed Feb. 18, 1935

INVENTOR
Clement C. Richard.
BY
Charles E. Visues
ATTORNEY

Oct. 4, 1938.                C. C. RICHARD                 2,132,244
   AUTOMATIC PROGRESSIVE DIE FOR STUD, BOLT, AND SCREW BLANKS
               Filed Feb. 18, 1935        12 Sheets-Sheet 6

INVENTOR
Clement C. Richard.
BY
ATTORNEY

Oct. 4, 1938.　　　　　C. C. RICHARD　　　　　2,132,244
AUTOMATIC PROGRESSIVE DIE FOR STUD, BOLT, AND SCREW BLANKS
Filed Feb. 18, 1935　　　　12 Sheets-Sheet 9

INVENTOR
Clement C. Richard.
BY
ATTORNEY

Oct. 4, 1938.   C. C. RICHARD   2,132,244
AUTOMATIC PROGRESSIVE DIE FOR STUD, BOLT, AND SCREW BLANKS
Filed Feb. 18, 1935   12 Sheets-Sheet 10
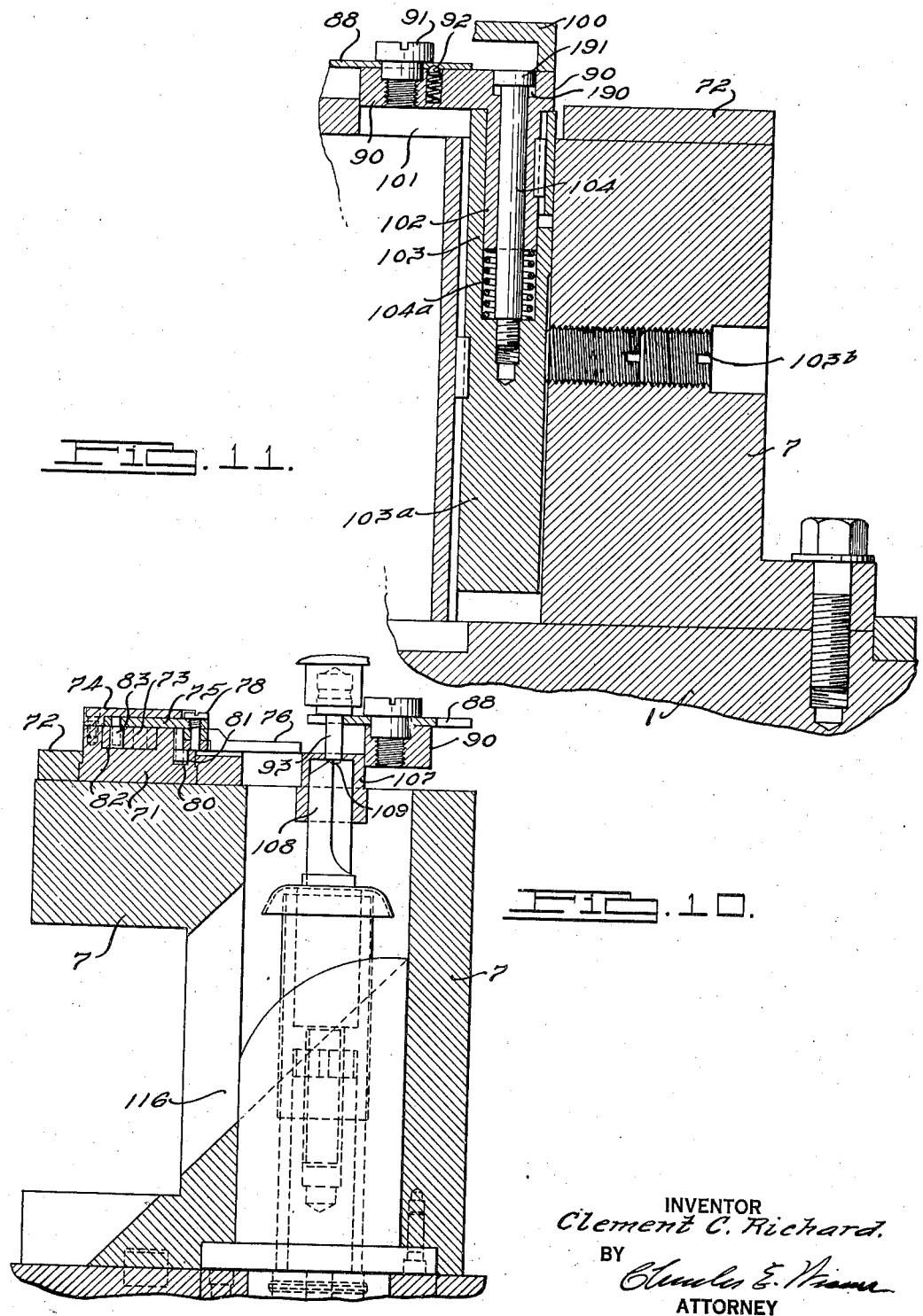
INVENTOR
Clement C. Richard.
BY
ATTORNEY Oct. 4, 1938.  C. C. RICHARD  2,132,244
AUTOMATIC PROGRESSIVE DIE FOR STUD, BOLT, AND SCREW BLANKS
Filed Feb. 18, 1935   12 Sheets-Sheet 11

INVENTOR
Clement C. Richard.
BY
Charles E. Vieau
ATTORNEY

Oct. 4, 1938.　　　　C. C. RICHARD　　　　2,132,244
AUTOMATIC PROGRESSIVE DIE FOR STUD, BOLT, AND SCREW BLANKS
Filed Feb. 18, 1935　　　　12 Sheets-Sheet 12
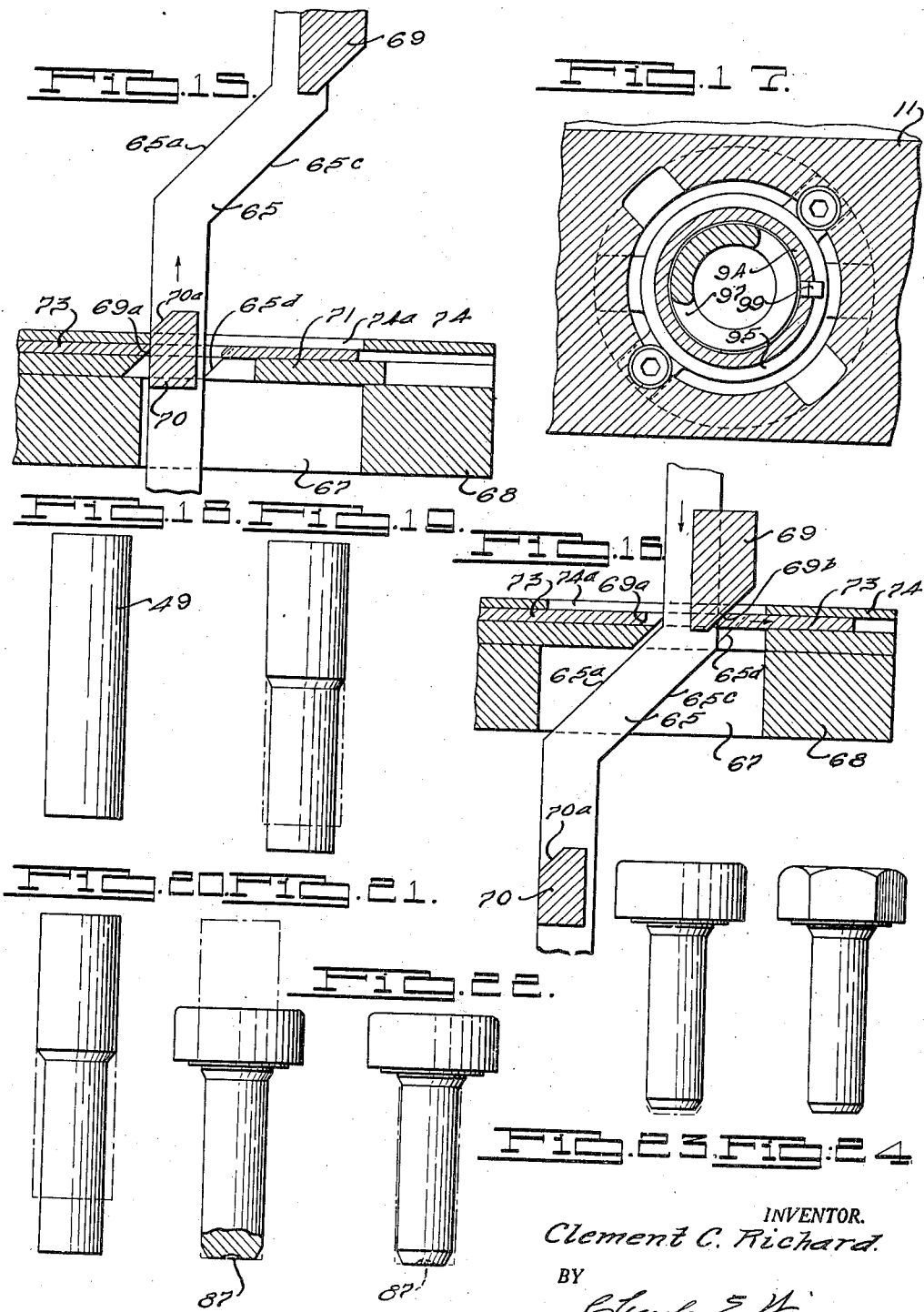
INVENTOR.
Clement C. Richard.
BY
ATTORNEY.

Patented Oct. 4, 1938

2,132,244

UNITED STATES PATENT OFFICE 2,132,244

AUTOMATIC PROGRESSIVE DIE FOR STUD, BOLT, AND SCREW BLANKS

Clement C. Richard, Bloomfield Hills, Mich., assignor, by mesne assignments, to Allied Products Corporation, Detroit, Mich., a corporation of Michigan Application February 18, 1935, Serial No. 7,061

20 Claims. (Cl. 10—12)

This invention relates to an automatic progressive die structure for producing screw blanks, bolts, studs and other articles of similar nature and the method of formation of such parts.

Heretofore, in the art of making screw blanks, bolts, studs and the like, it has been the practice to build a complete powered machine for the single purpose. This invention seeks to provide a structure for the making of such parts (except threading where threading is required) that can be mounted as a unit in an ordinary punch press in which there is a connection between the parts forming my improved mechanism with the header or ram of the press for operating the mechanism to pass the blank being operated on from one step of its formation to a succeeding step automatically. By such structure it is possible in a single automatic device to eliminate much of the handling between operations. Thus the time element is reduced as well as reducing the space required for the machinery and the cost of production in comparison with the commonly used single purpose machines. By simply removing my progressive die unit, the punch press may be used for its usual work and thus the driving mechanism and space occupied by the press may be kept in service when not required for use with my progressive die unit. It has also been necessary in the previous mechanism and method of forming such blanks to oil the same. This results in the cuttings adhering to the blank which tends to clog the operating parts and such oiled blanks required to be thoroughly washed prior to the threading operation. It is one of the objects of my invention to provide a machine for the formation of the blanks in a dry state.

It is also an object of this invention to provide an automatic progressive die for performance of various necessary operations required in the formation of a blank and that will form a number of blanks at one time, the machine shown in the accompanying drawings being designed to form three screw blanks or other parts ready for the threading operation with each stroke of the press.

It is also an object of this invention to provide an automatic progressive die in which screw blanks or the like may be formed from the usual hot rolled rods furnished by the steel mills and avoiding necessity of having rods drawn to certain specific finished diameter as is required in the usual single purpose machines. It is also an object and feature of this invention to so devise the operative parts and the character of operation at each step or station that the time required for the operation at any one station is practically identical with that required at any other station. By thus devising the parts and the work to be performed at each station, a completely finished blank ready for threading is produced in each series of dies at each stroke of the press.

It is also a feature of my invention to provide a structure in which the dies and punches forming a part of the machine will be compactly arranged and adapted for mounting in a suitable press and avoiding the necessity of a specially designed single purpose machine heretofore used for this purpose, the only requirement being that the press shall be of a capacity sufficient to furnish the power to perform the forming operations hereinafter described.

These and various other objects and features of the invention are hereinafter more fully described and claimed, and the preferred construction of a machine embodying my invention is shown in the accompanying drawings in which—

Fig. 1 is an elevation showing my improved progressive die unit of the character stated mounted in operative relation in a press.

Figs. 2, 3 and 4 together in side by side relation as numbered represent a plan view of my improved progressive die structure.

Fig. 7 is a vertical section of the front end of the machine showing the mechanism associated with and operated by movement of the header or ram of the press for progressively feeding the material through my automatic die mechanism.

Fig. 8 is a vertical section through the forward end of the progressive die unit.

Fig. 9 is a vertical section through the delivery end of the machine.

Fig. 10 is a vertical section taken on line $y$—$y$ of Fig. 4.

Fig. 11 is a vertical section taken on line $x$—$x$ of Fig. 4 showing the article handling device at one of the stations.

Figs. 15 and 16 are vertical sections showing different positions of the cams utilized in operating the transfer mechanism.

Fig. 17 is a horizontal section taken on line z—z of Fig. 9.

Fig. 18 is an elevation of the slug.

Figs. 19 to 24 are elevations of the blank indicating the work performed at the successive stations.

Figure 1:
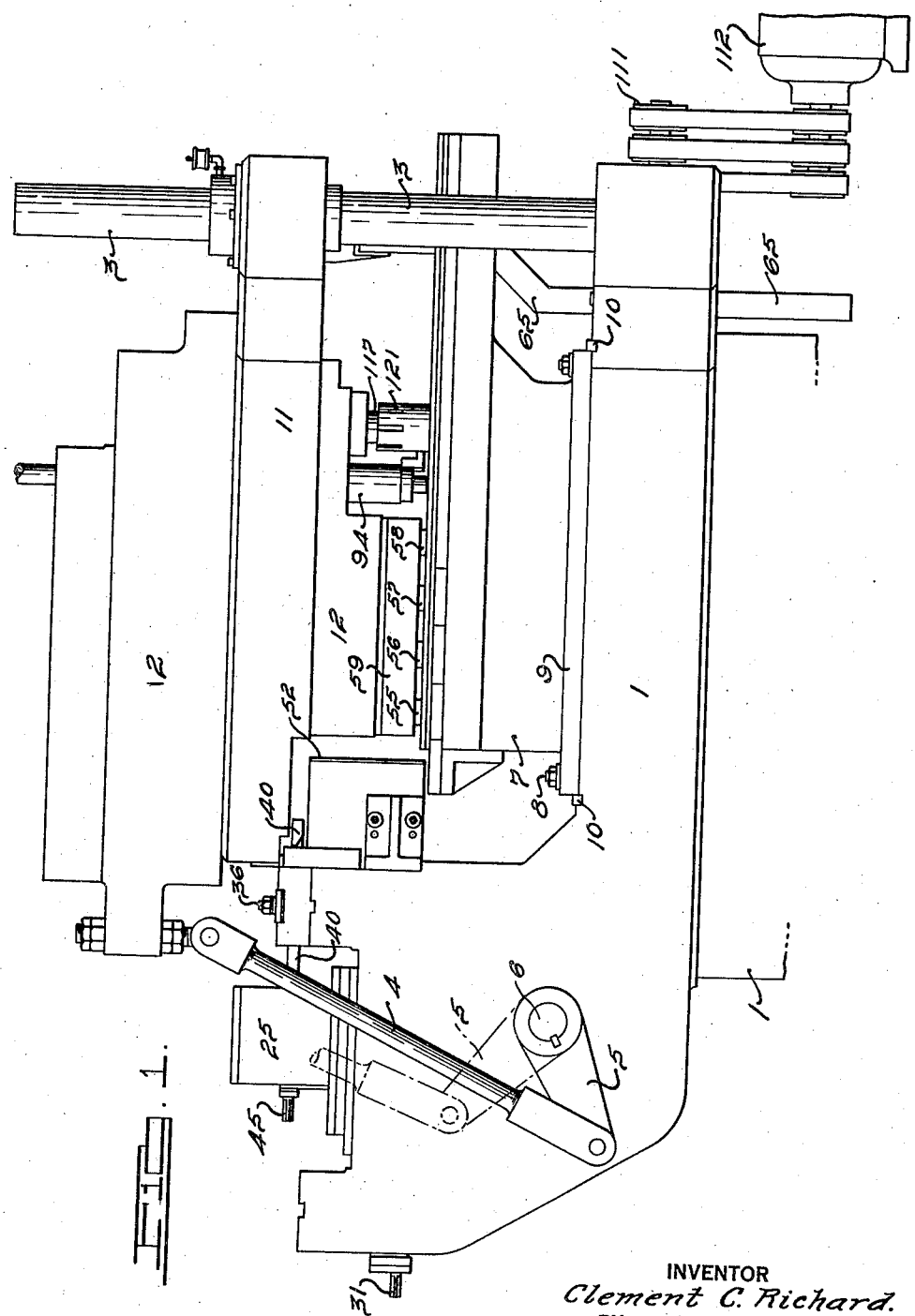

In order that a clear understanding may be had of the function and relationship of the parts of my improved automatic progressive machine, it is well to first consider that the single purpose machines now generally used in the making of such parts as screw blanks, bolts, studs and like devices are usually of a character utilizing sized wire fed from the coils cut off to proper length into slugs and the heading operation accomplished by two hammer blows, the first of which swages an end of the slug to approximately a pear shape and the second blow completing the formation of the head and the headed slug then delivered or conveyed in some manner to an extruding press or trimming machine as may be required for the next operation.

In such former machines where a slight extruding operation is necessary, the blanks are taken to a press for the extruding operation and thence to a trimming machine where the head is trimmed to proper shape, as square, hexagonal or other form as may be desired and the headed and trimmed blanks are usually washed and taken to a threading machine, usually a roll threading machine, and are subsequently heat treated.

In the previous method and mechanism utilized in the formation of such articles as screw blanks and the like, a number of single purpose machines are usually employed, the articles requiring to be handled in some manner for passing the same from one machine to the other and the speed of one machine may not be that of the preceding or succeeding machine of the group due to the character of the work being performed by such machine, that is, for instance the swaging of the end of the slug requiring two blows requires more time than the extruding press or the trimming machine.

A feature of my invention resides in the provision of mechanism for the successive operations and the operations are in such order and of such character that a slug in my unitary structure is cut off at one downstroke of the press. The slug on the upstroke of the press is then passed to the first of a series of forming dies wherein the body of the slug is partially shaped. On the next upstroke of the press the partially formed blank at the first forming die is transferred to a second forming die in which the blank is practically finally shaped. It is then passed to a heading and pointing die, a final sizing die; a pointing mechanism for finishing the point which is partially developed in the heading die; and finally is moved to a trimming die for cutting the head to the desired shape.

From the trimming die the finished blanks are delivered to a single purpose roll threading machine (not here shown).

It is thus to be seen and is more fully described hereinafter, that, by the structure herein described, the various steps taken in the formation of a screw blank, bolt, stud or the like by my improved mechanism are so arranged and the mechanism so devised that a like time period is required in the formation of the blank at each of the stations. It will also be understood that some of the operations heretofore performed in a single purpose machine have been divided into two or more operations at different points in order that the time period for the performance of each specific step shall be the same. By thus arranging the successive steps and changing the time period for the completion of what has usually heretofore been done as a single step in a single purpose machine, I have produced an automatic progressive die structure adapting the same to be used in an ordinary straight side vertical press in which there is a punch set mounted on the ram of the press and meeting with a die set held in exact position on the bed of the press so that upon the downstroke of the ram, once the various stations of the set have been provided with the blanks, a completed blank is made. With a single set of dies and devices required for the formation of the blanks, the press can make eighty blanks per minute at the usual speed of such presses. However, as these dies are comparatively small and the usual straight side vertical press is sufficiently wide in bed and ram, I have arranged three complete sets in a single body or frame in order that three rods may be fed into the machine and three completed blanks made at each stroke of the press.

It is possible to utilize the group of three die and punch sets in the usual straight side vertical press due to the construction and size of the die parts and mechanism required for each step in forming the blank. It is therefore pointed out that, by reason of the change in the character of some of the steps required in the formation of such articles, the method differs from that of the method as performed by the single purpose machines heretofore commonly in use and by this change in method, I have been enabled to greatly increase the production of such blanks per unit of time and have attained a further desirable object, viz, a much longer life of the parts. In respect to this latter point, the forming of the body of the blank is not all performed at a single point or station but is accomplished in two steps. Firstly, because in attempting to secure the completion of form at a single stroke of the press it is necessary to reduce the amount of work to be accomplished at any one point in respect to previous similar operations in the single purpose machines to the same time as is required for the least time consuming step required in the formation of the finished blank. Thus the first and second die sets for instance in my machine not being required to complete the formation of the body in a single die will stand up for a very much greater period of time than would be the case if the shaping of the body was performed at a single point or station. Likewise the pointing operation is divided into more than a single step in order that it may be completed in the required time period. Thus pointing is started at one point in the chain of steps and completed at another and in respect to the pointing operation a materially improved point is secured.

The pointing, which is the chamfer on the small or lower end of the screw blank, has ordinarily been performed by the heading die having a taper in the hole of the die at the correct angle and length so that after the heading operation is completed the lower end assumes a cup shape and is rough in appearance. In my machine the pointing is done during the heading as above described but there is a pointing operation following the final sizing operation utilizing a rotary cutter that trims the cup shaped end of the blank and at the same time takes a skin cut from the chamfered surface which is formed nearly to size by the heading die. Thus the finished blank is smooth and true to the exact particular length and shape required and provides a materially better finished product than has heretofore been made in single purpose machines. Thus the apparatus hereinafter more fully described does not follow the common practice of the usual screw machine devices heretofore in use as the entire operation according to my method is performed by an ordinary vertical press whereby a greatly increased capacity is obtained over that of any machine for forming such blanks now in use. Another resultant gain is secured by my new method or mechanism for forming screw blanks and the like and that is, that in the previous screw machines the blanks are oiled and thus small particles of metal, chips and the like stick to the blank. This requires a thorough cleaning of the blank before passing to the roll threading machines.

By my mechanism all of the operations are performed "dry", that is, free from oil and thus the blanks as discharged from this machine are passed directly to the roll threading machine perfectly clean and the time heretofore required in washing and cleaning and the mechanism for the purpose and space required for such mechanism are entirely eliminated.

In the drawings I have shown the dies set up as a unit comprising three complete sets of dies to each of which a rod is fed. These rods are all simultaneously cut into a slug for each set of dies and these slugs are all simultaneously passed through the successive stations in like manner and remaining at each station for the same time period.

The foregoing description of the progressive steps of the formation of the blank and the mechanism required is confined to a single set of punches, dies and mechanism required to complete the formation of the blank being formed and while I have heretofore mentioned screw blanks, bolts and studs, this machine is adapted to make practically any of what have heretofore been known as screw machine parts, the only change required being in the shapes of the dies and the mechanism utilized to make the finished product up to the point of threading if necessary.

In the preferred embodiment of the invention shown the stationary bed of the press is indicated at 1 and the movable ram or head of the press is shown at 2 which is slidable on vertical rods 3 one of which is shown in Fig. 1. The head or ram 2 of the press is reciprocated in the usual manner of such press mechanisms (not here shown) but it is by movement of this head that operation of my improved screw blank forming mechanism is actuated. The head, as shown, has pivotally connected thereto one end of a link 4 the opposite end being pivotally connected to a lever 5 fixed to a shaft 6. In the position of the parts shown in Fig. 1 the ram is at the bottom of its downstroke and the dotted lines showing the crank 5 and links 4 is the position assumed by these parts at the completion of the upstroke of the ram 2.

Figure 6:
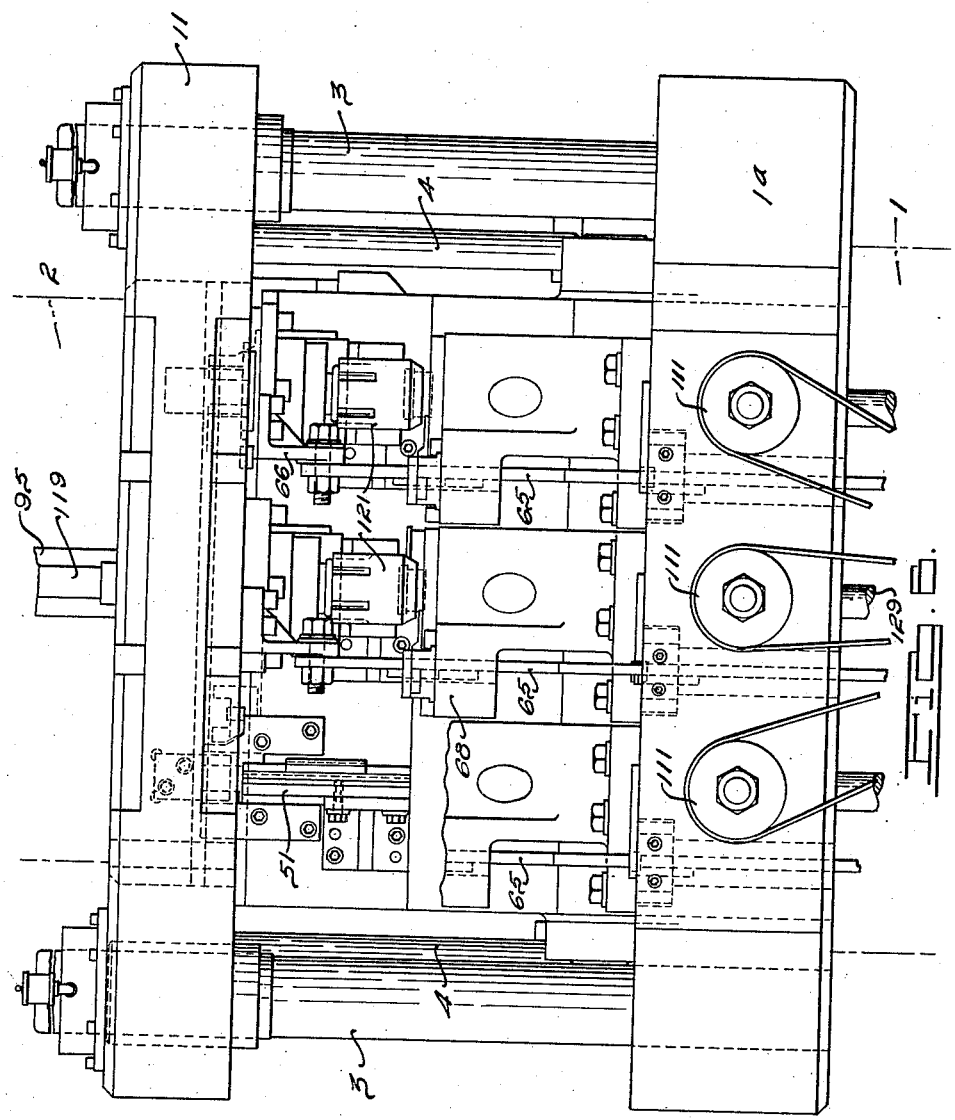
Fig. 6 is a rear end elevation of the machine at which end the completed product is delivered.

My automatic progressive die is simply mounted between the ram and the bed of the press and this mechanism consists in what I will for convenience call a die set 7 secured and accurately positioned on a base 1ª as by means of the studs 8 of which there are several extending through apertures provided in the flange 9 of the casting carrying the die set. Also, in the base 1ª is placed strips 10 particularly at the forward and the rear ends of the die set and to the ram or head 2 of the press is attached the punch holder base 11. This part 11 extends to one side of the head as shown in Figs. 1 and 6 and is there shaped to receive and slide on the rods 3 secured to the bed of the press. To this punch holder base 11 is secured the punch set proper indicated at 12. The die set 7 and punch set 12 are accurately fixed in relationship one to the other so that on each reciprocation of the machine the punches and dies are in a cooperative relation vertically one over the other.

Figure 2:
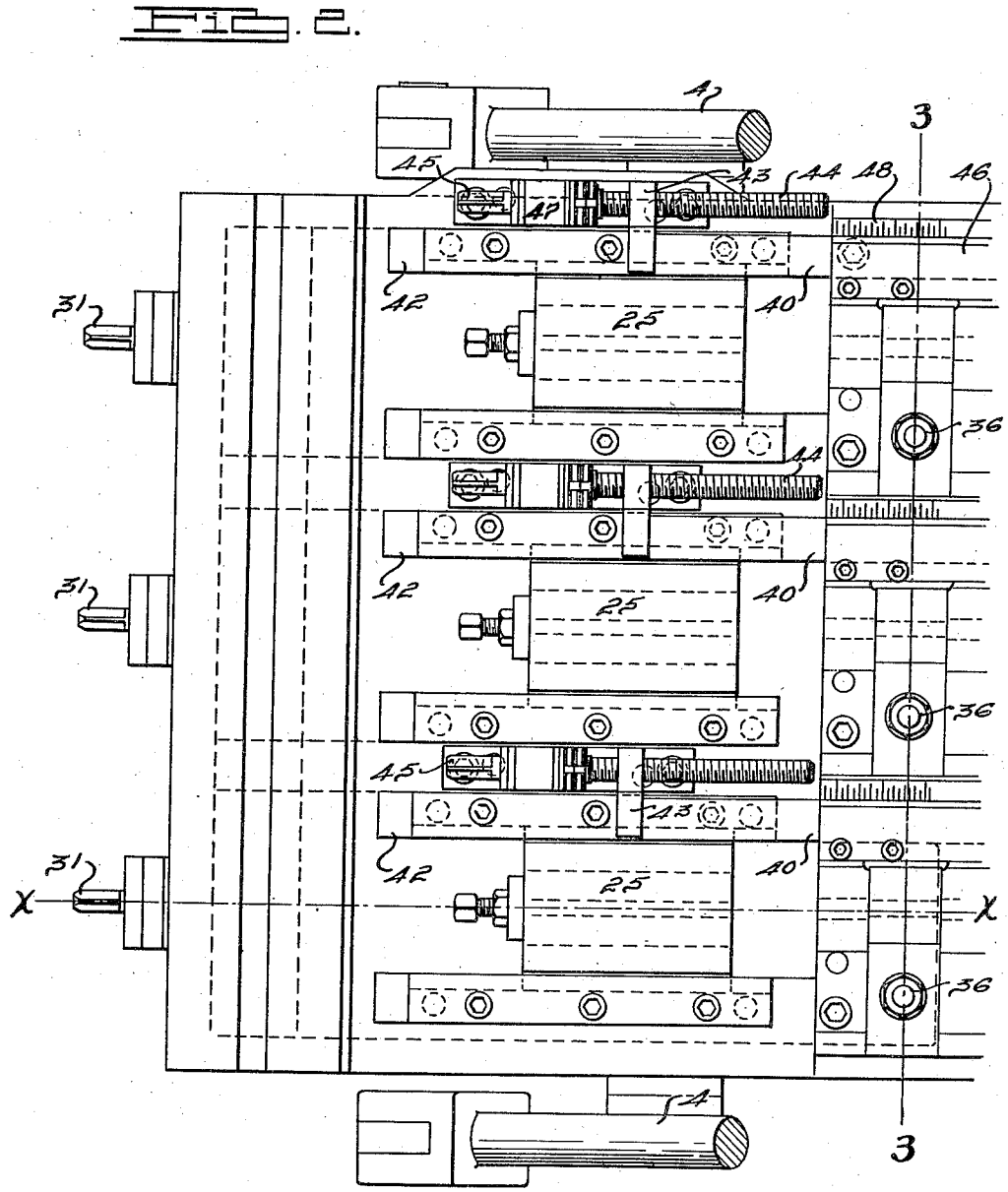
Figure 3:
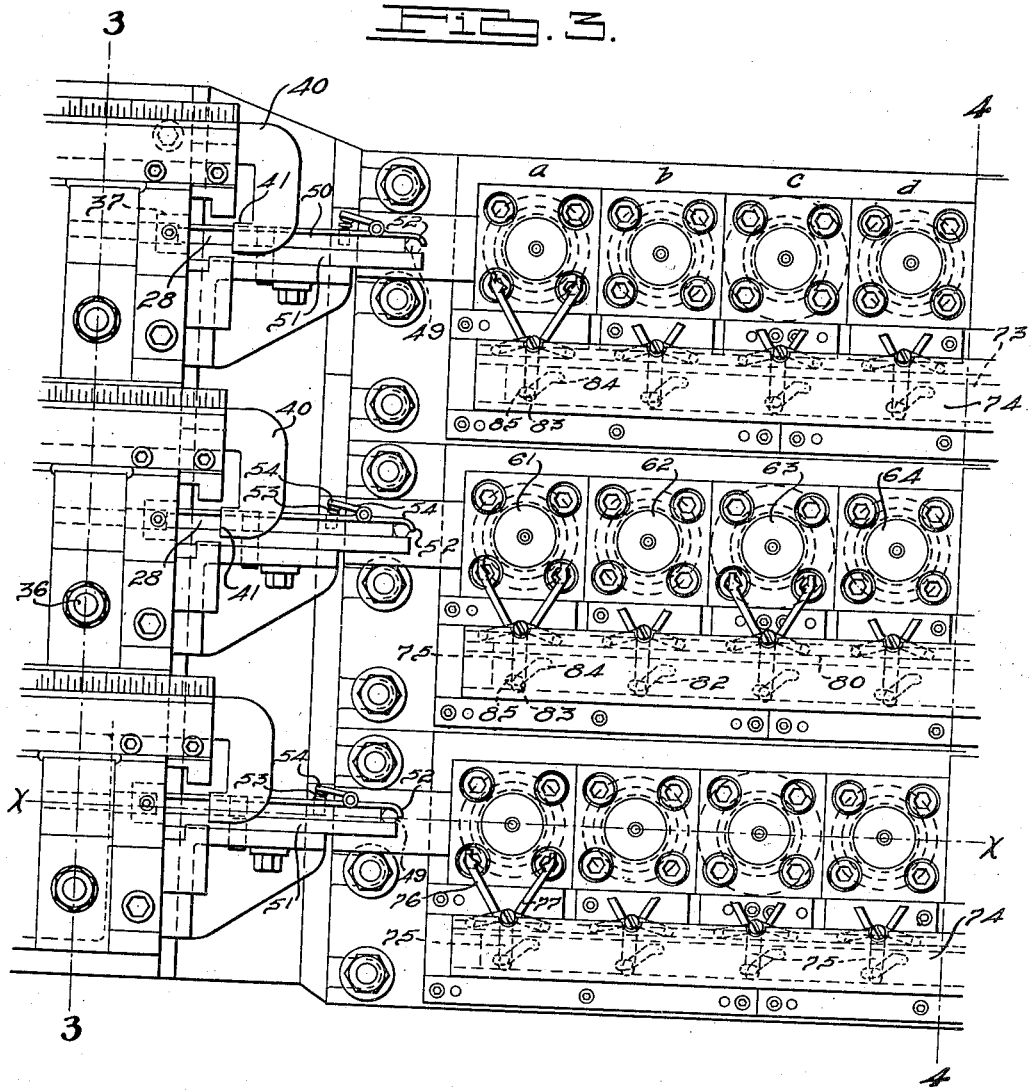
Figure 4:
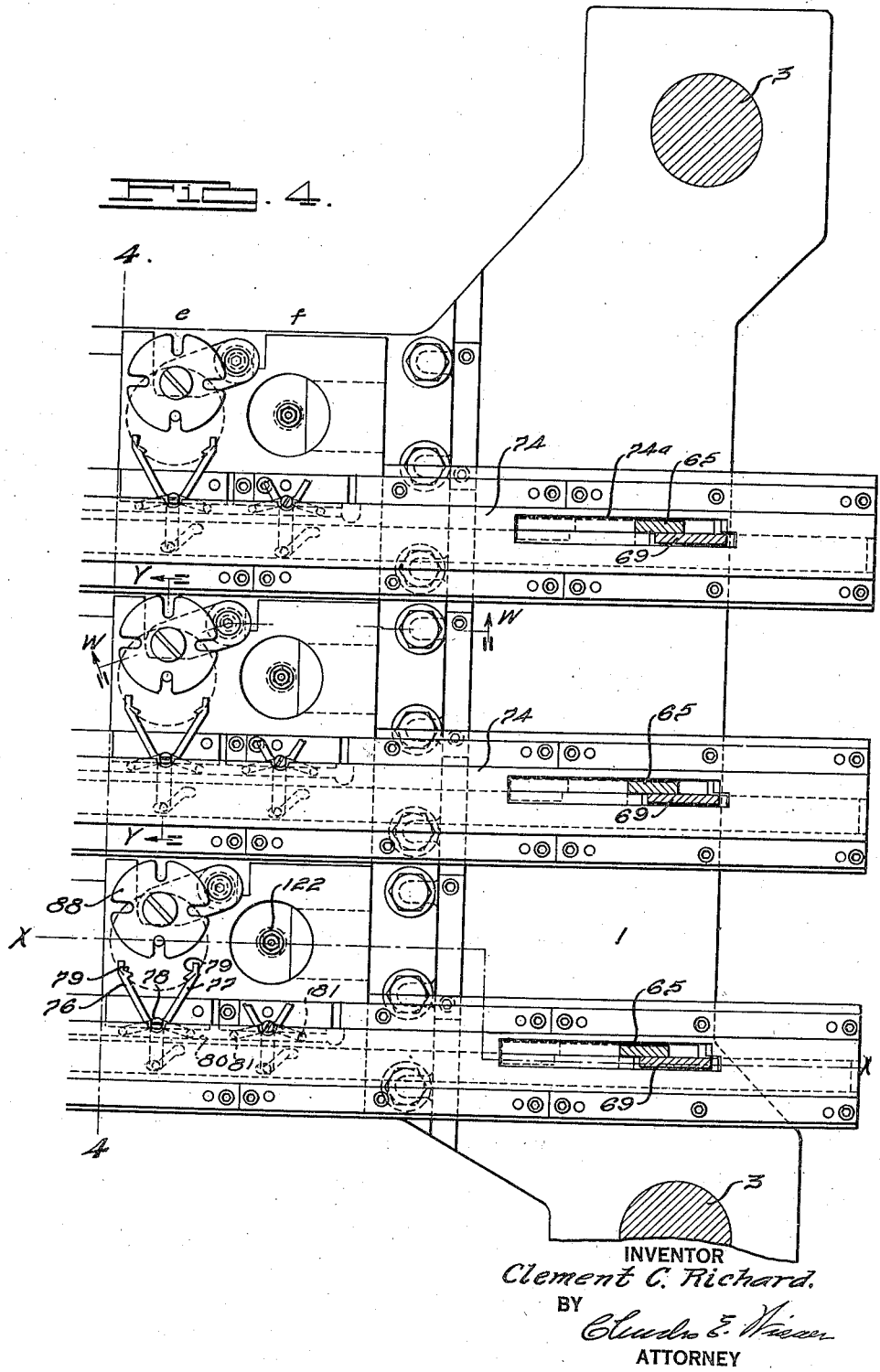
Figure 5:
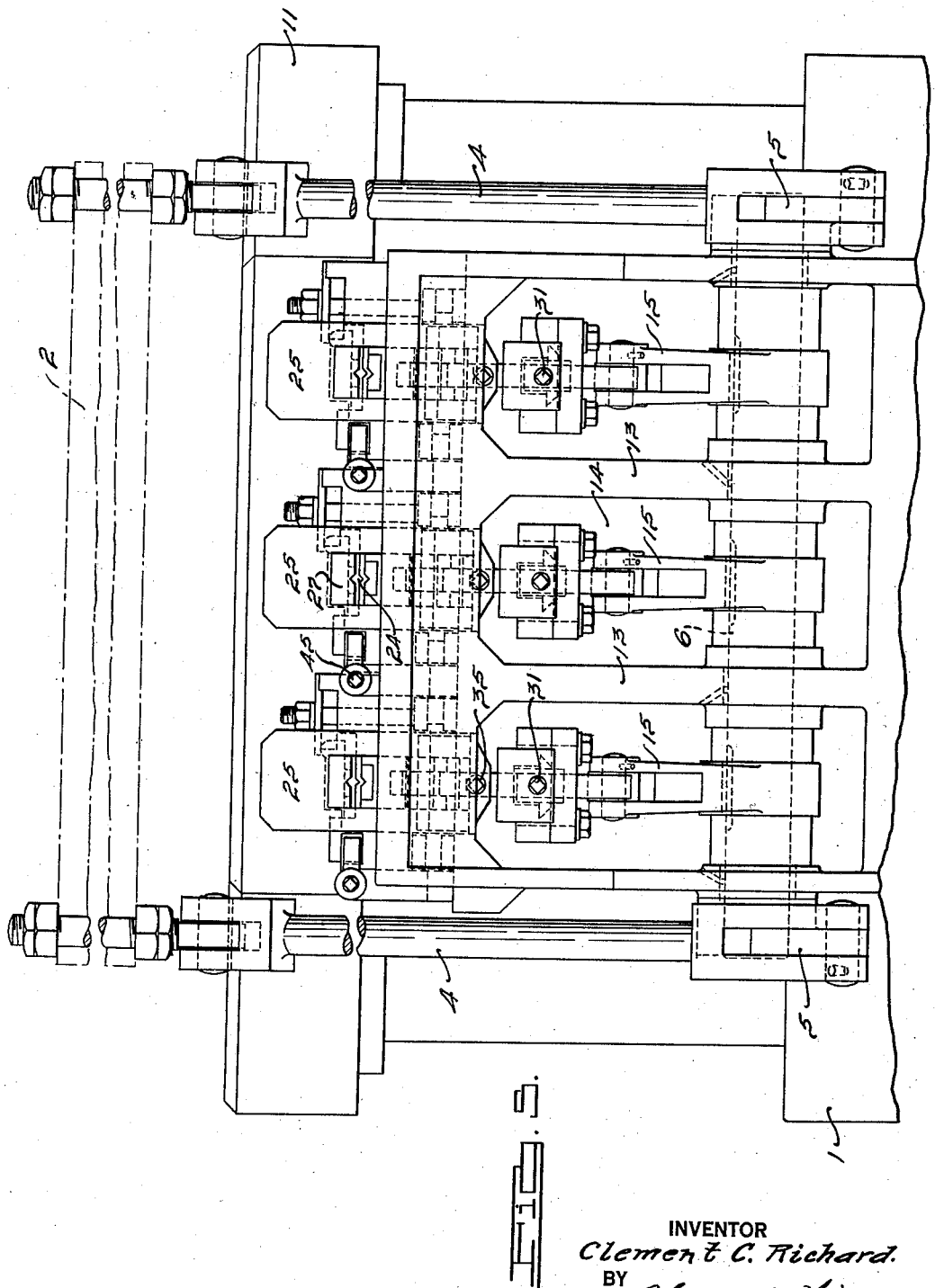
Fig. 5 is a front end elevation of the machine into which the material to be operated on is fed.
Figure 8:
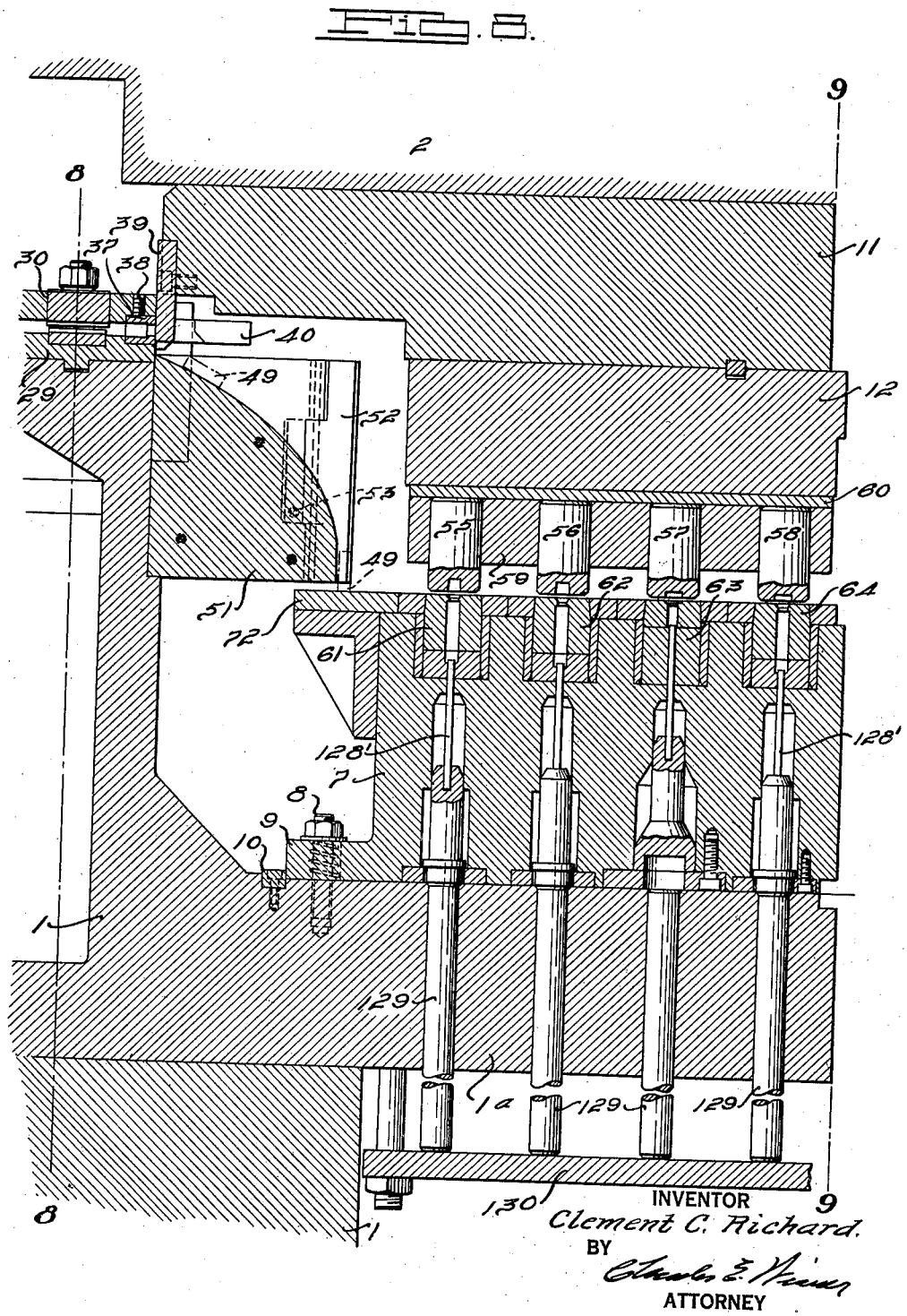
Figure 9:
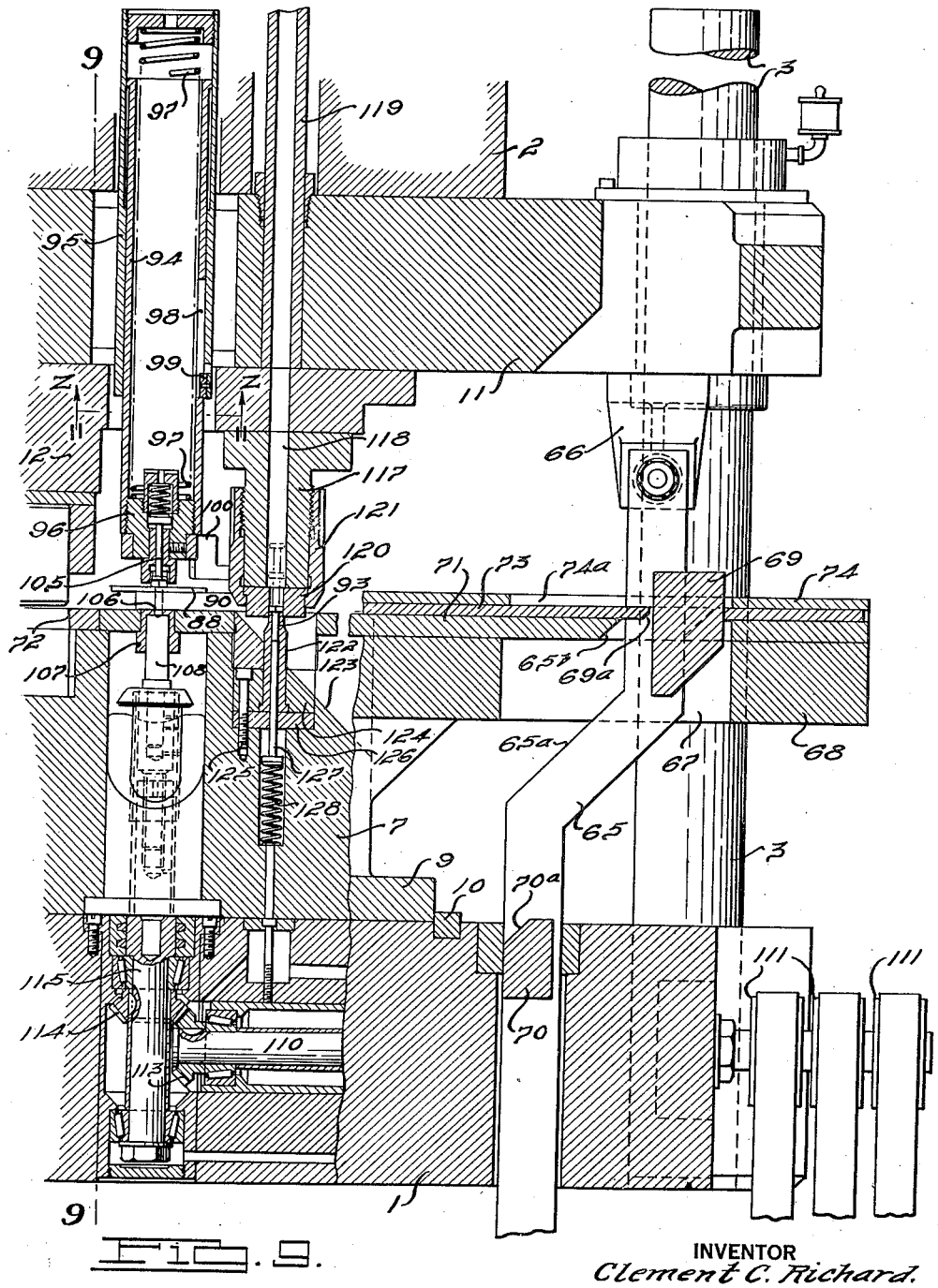

The plan view of the die set is shown in Figs. 2, 3 and 4. When the sheets containing these figures are laid side by side with Fig. 2 at the left the line 3—3 of Fig. 2 coincides with the line 3—3 of Fig. 3 and the line 4—4 of Fig. 3 coincides with the line 4—4 of Fig. 4. From these views it will be seen that there are three series of dies in the die set proper forming what is known as a triple die set. Likewise with the sectional views through one of the die sets and including the actuating mechanism as shown in Figs. 7, 8 and 9, line 8—8 on Fig. 7 coincides with the line 8—8 on Fig. 8 and the line 9—9 of Fig. 8 coincides with the similar line 9—9 of Fig. 9, these Figs. 7, 8 and 9 being sections taken on the line x—x of Figs. 2, 3 and 4.

As previously stated, the metal stock is fed by movement of the ram causing oscillation of the shaft 6 by the crank 5 and connecting rod or link 4. The end portion of the base 1ª in which the shaft 6 is mounted is formed of a series of vertical webs indicated at 13 in Fig. 7 forming a recess 14 companion to each set of dies and in each of the recesses 14 formed between the webs 13 is positioned a rock arm 15 fixed to the shaft 6. On the outer end of this rock arm is a roller 16 and this roller, through operation of the ram and shaft 6, plays between an adjustable jaw 17 and a fixed jaw 18' on a rod feeding device indicated generally at 18.

The feeding device 18 has an upwardly extending arm 19 pivoted to a shaft 20 and the arm extends beyond the pivot point and carries a roller 21 on a shaft 22. The short arm of the feed device carrying the roller 21 engages in a recess in the bottom of a movable rod gripping element 23 which carries a lower jaw 24. The shaft 20 is mounted in a slidable member 25 which is movable on a way 26. A companion rod gripping member 27 is secured to the head of the part 25 and between these two parts 24 and 27 extends a rod 28 (shown in Figs. 1 and 3) and through reciprocation of this member 25 the rod is moved through the holding clamps 29 and 30 mounted on the forward end of the bed of the machine. The jaw 17 of this feed mechanism is adjustable by means of a screw 31 supported at the outer end of the member 18 and the jaw 17 is slidable relative to the jaw 18', ways 32 being provided therefor and bolts 33 being provided to fix the jaw in its adjusted position. By rotation of the screw 31 in a nut 34 carried by the jaw 17 and by reason of the elongated holes through which the bolts 33 extend the jaw 17 may be moved toward or from the jaw 18'.

Figure 7:
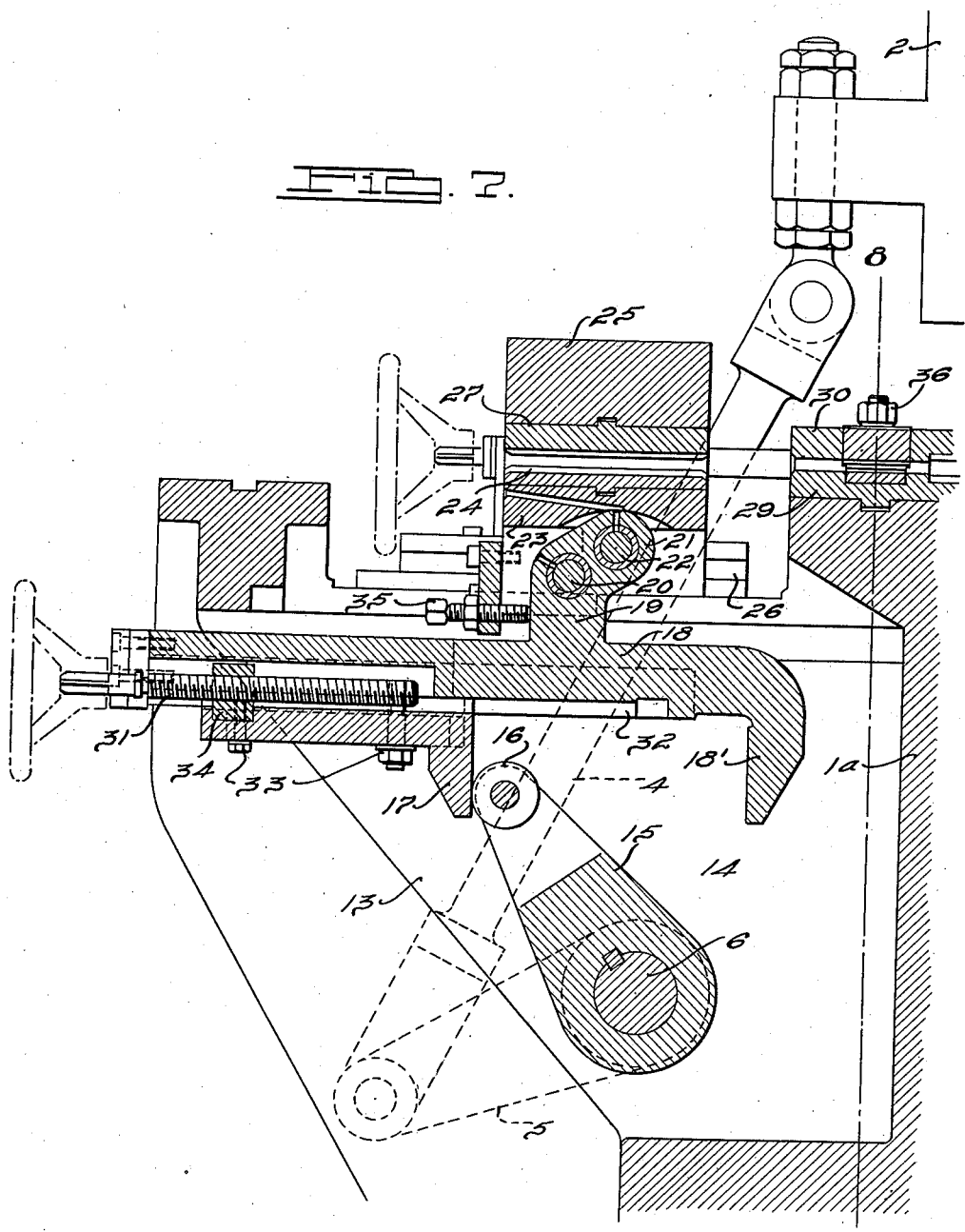
Figs. 7, 8 and 9 are vertical sections on the line $x$—$x$ of Figs. 2, 3 and 4 and specifically—

In the stroke of the press in the position shown in Fig. 7, the roller 16 contacts the jaw 17 and turns the gripping element of the feed mechanism to the left, a limit screw 35 being provided to limit the turning of the member 18 on the shaft 20. This movement releases the gripping jaws 24 and 27 on the rod 28. Contact of the roller 16 with the jaw 18' turns the roller 21 upwardly and causes the jaws 24 and 27 to first grip the rod and then movement of the arm 15 slides the member 25 in the feeding movement of the rod.

The clamps 29 and 30 through which the rod is fed may be of any approved type such as a spring clamp that will grip the end of the rod and prevents its pulling backward on the return of the yoke 25 to take a new grip preparatory to a succeeding feeding movement and any tension on the rod by these clamps may be adjusted by means of a nut 36. At the forward end of this latter clamp assembly is a cutoff bushing 37 of tubular form secured in place by a set screw 38. The forward or right hand end of the bushing, shown in Fig. 8, has an aperture of practically the same diameter as the rod passing therethrough and the bushing forms one member of a shear, the other member being a blade 39 which is secured to the punch block 11 so that, on each complete movement of the head or ram 2 and punch block attached thereto, an end of the rod is cut off forming a slug. The length of this slug may be varied by varying the stroke of the yoke 25 by the member 18 and crank arms 15 which are adjustable as heretofore stated to adjust the distance through which the yoke 25 is moved in feeding the rod. There is also a means to accurately check the length of the slug which consists of a stop member 40 which is a bar of L shaped form shown more clearly in plan view in Fig. 3 wherein the inturned end 41 is aligned with the cutoff bushing 37. The distance of this end 41 from the button determines the length of the slug.

The stop bar 40 lies at one side of the clamps 29 and 30 and extends rearwardly or to the left of Figs. 7 and 2 and is supported in a way in the casting 42 which also provides a way for the yoke 25. On this bar is a lug 43 having a threaded aperture for the screw 44 which has a square end 45 for a handle and by this means the bar 40 is adjusted to position the end 41 at the correct distance from the cutoff bushing 37. The bar is held in place by a plate 46 toward its forward end and the screw 44 is stationary and rotatably positioned in a stationary block 47 as will be seen in Fig. 2. I preferably provide a series of calibrations 48 adjacent the edge of the bar with which a mark on the bar may be positioned to determine the exact position of the stop end 41 of the bar.

As will be noted in Fig. 8, the slug 49, when cut from the rod stock, falls into a channel 50 formed in the block 51 as shown more clearly in plan view of Fig. 3. This channel bottom is down curved so that the slug 49 slides endwise by gravity to the vertical dotted position at the bottom of the channel with one end resting on the face plate of the die set. From Figs. 3 and 8 it will be observed that there is a vertically positioned hinged plate 52 associated with the block 51 and held in the closed position by a spring 53 engaging a lever like portion 54 on the plate 52 tending to hold it in the closed position shown in Fig. 3 and holding the slug 49 in vertical position as shown by the dotted lines in Fig. 8. Thus at each downstroke of the ram and punch set a slug is cut off for each of the three series of punch and die sets each of which are provided with the same cutoff mechanism and channel block 51.

Each punch set consists of a set of four punches in a row indicated at 55, 56, 57 and 58 in Fig. 8 and these are supported by a retainer 59 and a strike plate 60 is provided thereabove and supported by the sub-base 12 of the punch block. This punch set also includes additional elements operable through movement of the punch head in performing the operations required subsequent to the slug passing the last punch of the group as will be hereinafter described.

There is also a series of dies 61, 62, 63 and 64 supported in the die block 7 in vertical alignment with the punches and cooperative therewith in the formation of the slug. In the first punch and die station 55 and 61 the slug is pushed down into the die by the punch and is of a character to reduce its diameter to a certain extent less than the final diameter. In the second punch and die arrangement 56 and 62 the body of the blank is finally formed. It is here pointed out that to secure the proper timed relation for each of the operations the formation of the body to final shape is not accomplished by a single stroke of a punch and die which has heretofore been the practice. Such manner would be too slow and exerts too great pressure upon the punch and die and thus this work is allocated to two steps—firstly, a partial shaping to form and secondly, a final shaping to form of body.

In the first two sets of punches and dies above described the punch is shaped to receive the end of the slug and partially shape the same and the third one further shapes this end in a manner necessary to provide the desired head. In the punch and die 57 and 63 the head is practically finished in general form and from this position the nearly finished article is passed to the final sizing punch and die 58 and 64 in these successive steps in the successive punch and die elements described, a point is roughly formed.

From the sizing punch and die 58 and 64 the blank is moved to the next station which is the final pointing of the partially finished blank and at the last station the final trimming operation is performed. These two last stations are not punch and die structures as in the other stations and a description of the handling of the blank and of the mechanism employed at these two stations is given hereinafter but the several stations are identical distances apart and in the transfer of the blanks through the automatic punch and die mechanism and including the pointing and trimming stations once there is a blank for each of the stations in the machine the entire series of blanks are moved at one time and for convenience in further description of the functions that are performed at each of these stations and of the mechanism employed, I have designated the stations as a, b, c, d, e and f in Figs. 3 and 4.

The mechanism for transferring the blank from its first position in the channel of the holder or block 51 through the several punch and die, pointing and trimming stations is operable by movement of the ram of the press to effect transfer of the slugs from one station to the next. This mechanism comprises a cam 65 which is attached to the portion 11 of the punch set as shown in Fig. 9 by means of a bracket 70. 66. This cam member or bar extends through a slot 67 in a table like portion 68 extending from the delivery end of the die block 7 and this bar carries a side cam 69 on one face thereof as shown in Figs. 4 and 9 and also carries a side cam block 70 on the portion of the cam bar 65 riding in an aperture in the table portion 68. The down position of this cam bar 65 is shown in Fig. 9, the up position being shown in Fig. 15 and the intermediate position in Fig. 16. The slug transfer mechanism comprises a slide 71 positioned at one side of the line of forming stations as will be understood from Fig. 10 and rides in a way provided in the face plate 72 mounted on the die block 7. This plate 72 extends over the stations and receives the upper end of the dies at the separate forming stations on the die block 7 as will be understood from Figs. 8 and 10. The slide 71 carries a secondary slide 73 which is movable relatively longitudinally of the member 71 and is carried with it. A cap plate 74 is provided for the slide member and this plate is recessed to receive the transverse slides 75 each of which, as shown in Figs. 4 and 10, has the gripper arms 76 and 77 pivoted thereto on the pivot pin 78. The free ends of these gripper arms are shaped at 79 to engage the slug when in the closed position shown in Figs. 13 and 14.

The slide 71 also has a groove 80 extending longitudinally thereof and the short arms of the gripper members 76 and 77 have rollers 81 which ride in the groove 80. These slides 73 and 75 are carried by the main slide 71 and move with it in carrying the gripper elements from a rear to a forward station or the reverse as the case may be. That is, the grippers are operated in movement from one station to the next by the slide 71 and are closed and opened by a relative movement of the slide 73. It will be noted from consideration of Figs. 12 and 13 that the grippers in the opening movement are brought away from the station transversely of the direction of movement of the slide 71 and in the closing movement are brought toward the station to position the gripper ends about the slug. When in the open position, the slide is operated by the cam bar 65 to carry these grippers to the left of the position shown in Fig. 3 to position to engage the slug 49 in the hollow block 51. The grippers, which are equal in number to the number of forming stations, are then closed to engage the slug at each station and the several grippers upon gripping the slug at each forming station (except the last of the series), the slide is moved to the right of the position shown in Fig. 3 to carry the slug 49 to the first station and the slug in the first station to the next and so on through the entire series of stations. The opening and closing movement of the grippers is performed by the slide 71 which is provided with angularly disposed slots 82 one for each gripping device in which the rollers 83 ride.

The rollers are secured by a pin to the transverse slide 75 carrying the gripper arms. It is to be noted that the angularly disposed slots 82 have the parallel portions 84 and 85 at opposite ends into which the roller 83 rides at the completion of movement in one direction or the other of the slide 73. By such movement of the slide 73 and due to the angular portion of the slot 82, the slide 75 is moved toward or from the station and carries with it the gripper arms the short ends of which have the rollers 81 in the groove 80 of the slide 71. Movement of the slide 75 at each of the stations toward the stations will therefore cause the grippers to close due to the rollers 81 of the gripper arms riding in the slot 80 and on movement of the transverse slide 75 in the opposite direction causes the gripper arms to open. This operation of the grippers by movement of the transverse slide 75 is caused by movement of the slide 73 relative to the slide 71 and at the completion of movement of the slide 73 in either direction, the rollers 83 of the transverse slides 75 ride into the end portion 84 or 85 of the slot 82 depending upon the duration of movement of the slide 73, and holds the slides 75 from transverse movement in either direction toward or from the respective work station. This peculiar movement of the slide elements, as will be understood from Figs. 9, 15 and 16 is caused by the vertical reciprocation of the cam bar 65 attached to the head 11.

Figure 13:
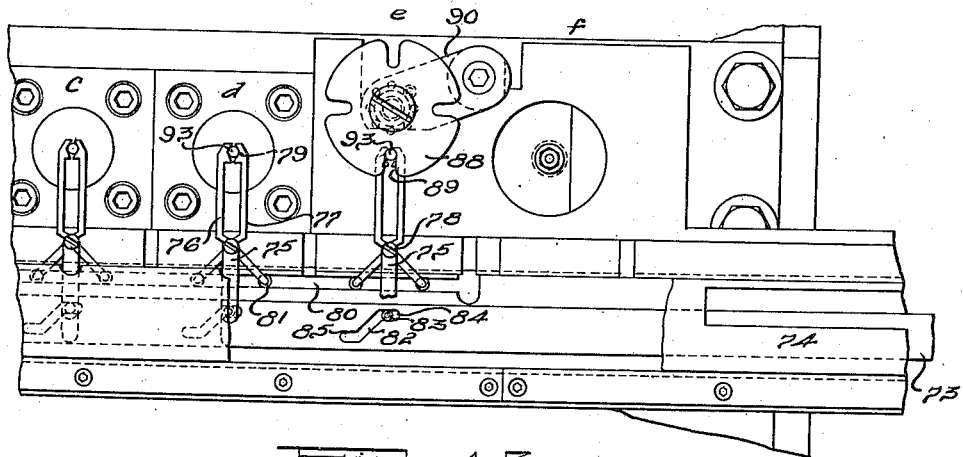
Fig. 13 is a similar view showing the position of the automatic handling arms at the top of the upstroke of the press.

On movement from the position shown in Fig. 9 the inclined face 65ᵃ of the cam bar engages the inclined face 65ᵇ of the aperture of the slide 71 in which the bar is movable. In the position of the parts shown in Fig. 9 the block 69 is in the aperture 69ᵃ of the slide 73 in which position of the parts and relative position of the slides the grippers are in open position as will be understood from Fig. 4. The cap plate 74 has an aperture 74ᵃ of the same length as the aperture 67 in the table extension 68. As this cam bar 65 is raised from this position the cam block 69 carried by the bar 65 is raised out of the aperture 69ᵃ of the slide 73 and the inclined edge 65ᵃ of the bar 65 engages the inclined face 65ᵇ of the aperture of the slide 71. This upward movement of the bar 65 therefore moves the slides 71 to the left of Fig. 9 which is the position of the parts shown in Fig. 15. Just at the completion of this upward movement of the bar 65 the inclined face 70ᵃ of the cam block 70 engage the inclined edge 69ᵃ of the slide 73 and moves it to the left of the position shown in Fig. 9 causing the gripper arms to close on the slug or blanks at the various forming stations. It is to be noted that the inclined edge 65ᵃ of the cam bar 65 has at this time passed entirely above these slides and the slide 71 has completed its movement and thus positions the grippers when in the open position in alignment with the slug or blank at each of the stations and then this cam block 70 is brought into operation to cause the grippers to engage the slug or blank as shown in Fig. 13.

On downward movement of the cam bar 65 the opposite angular face 65ᶜ of the bar 65 engages the face 65ᵈ of the slide 71. This face is of such length and the stroke of the press is such that, in this movement of the bar 65, the entire slide mechanism is moved to the left a distance equal to the distance between forming stations and just as this downward movement is completed, as shown in Fig. 16, the cam block 69 engages the angular face 69ᵇ of the slide 73 which moves the slide 73 to the left and thus the slots 82 are brought to the open position shown in Fig. 12 and the grippers are then held open due to the roller 83 riding into the end 85 of the slot 82 until a reverse movement of the slide 73 takes place as previously described.

It will be seen from this description of the cam bar 65 and the associated cam blocks 69 and 70 that the slide mechanism is entirely automatic being timed by movement of the ram of the press and head 11 to move the grippers to carry the slugs to the stations and as they are positioned at the stations the gripper jaws are released as soon as the blank is held in position by the punch and die parts as hereinafter described. Thus at each stroke of the press the grippers are actuated to move to the left in open position and at the end of the movement are caused to grip the slug at the block 51 and carry it in vertical position to the first punch and die set 55 and 61 as shown in Fig. 8 while the punch is in its upper most position and the blank at each of the forming stations is transferred from a prior station to a succeeding station at the same time as will be understood from the position of the slide 71 in Fig. 9 in contrast with its position shown in Fig. 16.

It is to be noted that the slide 73, which controls the opening and closing of the grippers, is being actuated to open and move the same away from the station in the position on the cam block 69 in Fig. 16 and this is so timed that the slug 49 of Fig. 3 is set on the die member 61 and is engaged at the upper end by the punch 55 before the slug is released by the grippers. Thus at no interval of time is the slug free to become displaced but as the punch engages the upper end of the slug and pressure begins to be exerted to force the same into the die, the grippers are moved out of the way permitting the die to complete its movement. This is the relationship of the parts through all of the punch and die sets 55—61, 56—62, 57—63, and 58—64. Each of these stations are ordinary punch and die sets. The punch at the first station has an aperture to receive the upper end of the slug and this character of aperture changes in the succeeding punches so that the head is formed by the last punch 58 of this series shown in Fig. 8. The companion dies to these portions 55, 56, 57 and 58 are respectively for the first extrusion, second extrusion, head and partially pointing and sizing. No attempt has been made to shown specific forms of punches and dies in Fig. 8 as the form will vary depending upon the character of part to be produced. The shape of one character of part is shown in Figs. 19, 20, 21 and 22 as being typical.

In Fig. 18 is shown a slug cut from the rod.

Fig. 19 is the form produced in the first forming die at station a and the dotted lines indicate its variation from the form of the slug of Fig. 18.

Fig. 20 is the form produced by the second forming at station b and its variation in form relative to the slug.

Fig. 21 is the form produced at station c showing the formation of the head and the pointing, the dotted lines indicating the change in shape from the form shown in Fig. 20.

Fig. 22 is the final sizing, the dotted lines showing the reduction in diameter of the body of the blank.

Fig. 23 is the form produced at the pointing station e in which the point is finished as to exterior surface and the cup end finished and final length determined. The dotted lines at the lower end of this figure are used to indicate the work done on the point formed at the preceding station c at which station the point is usually rough particularly at the terminal end and a little long.

Fig. 24 shows the final trimming of the head at station f and the finish of the under side of the head.

From this showing of a single character of blank to be produced, an understanding will be had of the manner of gradual formation of the part in passing through the successive forming stations.

Figure 12:
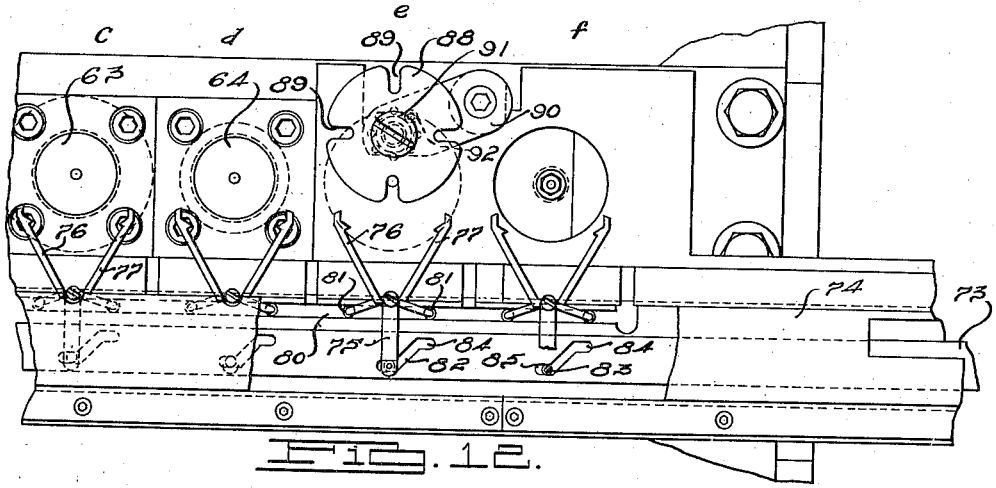
Fig. 12 is a detail plan view of the article transferring mechanism in the position at the bottom of the down stroke of the press.
Figure 14:
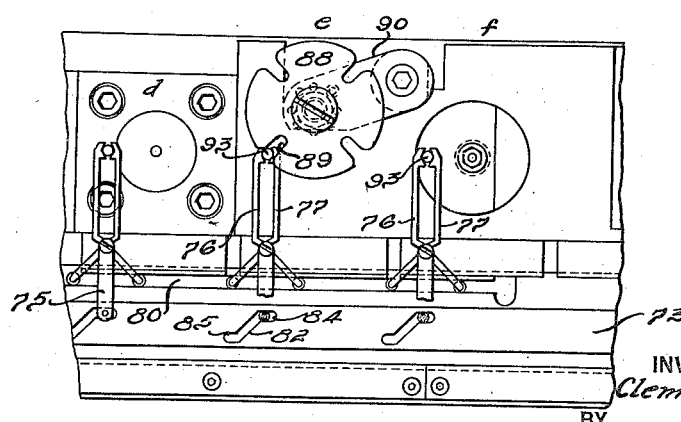
Fig. 14 is a similar view showing a different position of the parts.

It will be seen that at the time of heading by the punch 57 at station c the point is formed as indicated at 87 and shown in Fig. 21. This point is formed by the die 63 and at this station c of the series the point is rather rough formed and is not accurate as to length and the coned face thereof is not smooth but corresponds practically completely with the character of the points made in the usual single purpose machines from which machine the blank is left in this rather rough finished state of point. It is also to be noted that these punch and die sets may alter in form as may be required for the making of any of the shapes of blanks that may be desired. In any event, whatever the specific form of the bolt, stud, screw blank or the like being made, the form gradually changes from one station to the next through these successive forming stations a, b, c, d, e and f. The pointing station, which is the station e, is not strictly a punch and die operation although the mechanism is operated in the same manner by a stroke of the ram and the mechanism is shown more clearly in Figs. 9, 10, 11, 12, 13 and 14. In the plan views Figs. 12, 13 and 14 is shown a rotatable disc 88 having four blank receiving notches 89 in its periphery. This disc, as shown in section Figs. 10 and 11, is comparatively thin and is supported on an arm 90 by means of the screw 91, the disc having a central aperture and being rotatable on the screw and positioned by the spring-pressed ball 92 which engages recesses in the under side of the disc 88 as shown in Fig. 11.

There are eight such ball recesses, one for each of the notches 89 and one between each of the notches of the disc and the ball seats in a recess when a notch 89 with a blank therein has been turned to the position shown in Fig. 13 in which the blank is indicated at 93 and also seats in a recess when the disc is in the position to receive a blank as indicated in Fig. 14.

These blanks, as before stated, are moved from station to station in vertical position and are shown in end view in Figs. 12, 13 and 14. In the position of the parts shown in Fig. 14 the grippers 76 and 77 for handling the blank have moved the blank from the station d and the disc is so positioned and releasably held by the ball 92 that the blank 93 enters the notch 89 in the disc as shown in Fig. 14. This is an intermediate position of the grippers in movement from station to station and by further movement of the grippers by the slides heretofore described and due to the blank 93 being in the notch 89, the disc is rotated by means of the grippers and blank from the position shown in Fig. 13 to the position shown in Fig. 14 by movement of the blank transferring mechanism to the right of these Figures 13 and 14. On completion of this movement a blank is positioned at each of the forming stations. The position of the angular slots 82 in the slide 73 and of the roller 83 therein is shown in these Figs. 13 and 14. The grippers are then required to open which is accomplished by movement to the right of the slide 73 and the roller 83 of the gripper slide is thus changed in its position in the slot to the position shown in Fig. 12 thereby opening the grippers 76 and 77 in the manner heretofore described. Thus the grippers have moved away from the disc and have opened.

At the time the blank is positioned in the disc the head is at the upper side of the disc and the bottom end is just out of contact with the surface of the plate 72 and the position of the cam block 69 in respect to the stroke of the ram is such that the grippers are not released from the blank until the blank has been taken charge of by the pointing apparatus shown in section in Fig. 9, and this consists of a reciprocable member comprising a spring-pressed tube 94 riding in a stationarily supported tube 95 carried by the head 11 of the punch set attached to the ram. At the lower end of this tube 94 is a block 96 against which the coil spring 97 seats. The tube 94 is restricted in its longitudinal movement by means of a slot 98 in its side in which is engaged a block 99 on the stationary tube 95. On the down movement of the head 11, as shown in Fig. 9, this tube is in its uppermost position and as the head is moved upwardly from this position the tube 94 and the block 96 are held stationary in position by the spring until the block 99 reaches the upper end of the slot 98 whereupon the tube 94 and the block 96 are carried upwardly. On the bottom end of the tube 94 is an arm 100 which arm is shown in Fig. 11 as engageable with the arm 90 carrying the disc 88. The arm 90 in Fig. 11 is in its down position in a recess 101 in the plate 72 and has a tubular extension 102 riding in an aperture 103 of the holder 103a secured in the die block 7 by a set screw 103b. In the aperture of the tubular portion 102 is a statonary headed bolt 104 and a spring 104a is positioned about the lower end of the bolt beneath the lower end of the tubular portion 102 tending to raise the member 90 from the position shown in Fig. 11.

The arm 100 on the sliding tube 94, when in the uppermost position, is out of contact with the arm 90 and as it comes toward the position shown in Fig. 9, a spring-pressed member 105 engages the head of the blank in a notch 89 of the disc 88 and just as this tube 94 and arm 100 have completed the downstroke the head of the blank is contacted and the disc and arm moved to the position shown in Fig. 11 which movement forces the end of the blank through an aperture 106 in a receiver thimble 107 in which the upper end 108 of the rotary cutting pointer is positioned. This cutter is shown more fully in Fig. 10 wherein it is seen that the point 109 finishes the pointed end of the blank 93 and also finishes the cupped face of the point. This cutter runs at a high speed and may be driven by a shaft 110 mounted in the portion I of the die set. There is a shaft 110 for each of the three series of punch and die sets which extend to the right hand side of Fig. 9 and there each shaft is provided with a pulley 111. These pulleys, as shown in Fig. 1, may be driven by an electric motor 112 by means of belts. Each of the shafts 110 have a beveled gear 113 thereon meshing with a beveled gear 114 on the lower end of the cutter driving shaft 115. As indicated in Fig. 10, there is an angularly disposed aperture 116 opening at the side of the aperture of the block 7 in which the cutter is positioned. The chips formed by the cutter in finish pointing of the blank are delivered from the machine through this aperture 116.

Just prior to completion of the next upstroke of the head by the ram and after the pointing has been finished, the arm 100 is raised out of contact with the disc supporting arm 90 which releases the said arm to upward movement by the spring 104a. This brings the blank again to position with the lower end just above the surface of the plate 72 and the last pair of grippers at the right of Fig. 12 may be then moved to the position shown in Fig. 13 to grip the blank and move the blank 93 to the last station f of the series of stations. In so doing, the disc is turned forty-five degrees from the position in Fig. 13 to the position shown in Fig. 14 and the blank 93, as shown in Fig. 14, is being carried to the last station which is the head trimming station and, in this movement, the disc 88 has been positioned with the notch 89 to receive the blank from the station e. The spring-pressed ball 92 simply is a resistance preventing rotative displacement of the disc 88 and there are eight ball recesses for the ball 92, that is, there is a ball recess for each position of rest of the disc 88. One of those positions is shown in Fig. 14 at the bottom left side and this notch 89 is then moved to the position in Fig. 13 at which time the ball seats in a respective ball recess. Thus there are two ball recesses for each notch in the disc.

The last station f of the series is the final head trimming station and its function is performed by the movement of the ram of the press and head as is the case with the operation of the forming means at each of the other stations. At this last station f a block 117 is attached to the central punch head 11 and 12 which block has a central punch head 11 and 12 which extends upward through the aperture 118 which extends upward through the flange of the portion of the punch head 12 and a tube 119 is secured in the punch head portion 11. On the lower end of the member 117 is the head-trimming die 120 held by a gripper sleeve 121 and the blank in being passed from the disc of the station e to this last station f is placed with its lower end directly over a tubular stem 122. As the die 120 is carried downward by movement of the head it engages the head of the blank until it seats upon the upper end of this tube 122 and the head of the blank is then trimmed to desired peripheral shape by the die 120, the cuttings passing down through a sluiceway 123 provided on the base portion 7 in which the tube 122 is mounted. The stem 122 is secured in place by a block 124 held in place by a screw 125 which also holds a guide block 126 for a rod 127 spring-pressed upwardly and tending by its spring 128 to move the blank 93 upward out of the stem. On the next trimming stroke the blank is forced up out of the die into the hollow portion 118 of the block 117 and thence through the tube 119 and as each successive blank is moved upwardly therein the blanks are delivered to wherever the upper end of the tube may lead.

The blank 93 has its body in finished state at this time and therefore is not a particularly close fit in the hollow stem 122 and may be readily moved outwardly by the pressure of the spring 128. Thus at the pointing station the lower pointed end of the blank (if a point is to be formed) is finished as to length from the under side of the head which rests on the disc 88 and in the last station the head itself is trimmed to final shape as the trimming of the head is not performed until the blank has been seated in the stem to support the same against the pressure of the head thereon. It is so trimmed that it can pass upwardly out of the die and into the tubular recess 118 wherein it is sufficiently free as not to stick. Thus at the station e the blank is freed from the cutter assembly by the disc and in station f by the pin 127 which acts as a knock-out pin. In the stations a, b, c and d there is provided the usual punch press knock-out pins 128' which are similar at each station and are carried by rods 129 which project through the base 1a of the die set into engagement with a knock-out plate 130 in the bed 1 of the press which operates similarly to any of the usual knock-out plates for presses of this character functioning as the ram moves upwardly and prior to the finish of the upstroke. As this is common mechanism utilized with presses in general use, no mechanism is here shown for operation of the plate 130.

One of the important features of this invention is the use of a final sizing die at station $d$. This will be understood from the following:

The first two stations $a$ and $b$ are what have been termed the first and second forming stations and in these two dies the body form at least is oversize in diameter. Firstly, so that sufficient stock at station $b$ will be left for the final sizing at station $d$. Secondly, by use of a final sizing die at station $d$ subsequent to the formation of the head at station $c$ the two forming dies at stations $a$ and $b$ will last for a very much longer period than if the stock is sized at the said stations $a$ and $b$. The first and second forming dies wear rapidly to beyond the oversize limits and thus only about fifteen to twenty thousand parts can be made before the dies have to be changed but, due to the use of a final sizing die in the lineup herein described at station $d$, any error in the dies $a$ and $b$ as to diameter is corrected and inasmuch as the error is only slightly oversize, the work to be performed at station $d$ is materially less apt to wear the die at station $d$. Thus it retains its proper size over a long period of time so that a million or more parts can be made with this allocation of the work at the successive stations and particularly the final sizing at station $d$ without change of dies. Due to the use of a final sizing die at station $d$ the dies $a$ and $b$ may wear considerably oversize without detriment. This step of final sizing subsequent to formation of the blank is a departure from known practice.

Therefore, the cost is reduced materially as the finished blanks do not run oversize and due to the fact that the extrusion dies at least are formed of a tungsten-carbide composition to secure extreme hardness, the cost of which is somewhere between $75.00 and $100.00 each, it is important to retain these dies in operation for as long a period as is possible.

The second important feature and departure from known practice is the pointing mechanism at station $e$. At this station is used a notched disc 88 to which the blank is brought by the transfer mechanism heretofore described and positions the same over the member 107 in Fig. 10 apertured to receive the end of the blank 93. At the time the blank is positioned in the disc it is in its upper position, it is held in this up position by the spring 104ª heretofore described acting on the stem 102. At this time the lower end of the blank 93 is above the surface of the plate 72 and is aligned vertically over the aperture in the thimble 107 provided therefor. It is important to secure a sufficient time interval within the time period of the stroke of the press for the pointing and length trimming device to finish its work. The tube 94 and its arm 100 in its lowermost position leads the punches at the prior stations and thus the arm 100 engages the arm 90 carrying the disc prior to the punches engaging the heads of the blanks at the prior stations of the series. This movement therefore forces the lower end of the blank 93 to the cutting position as shown in Fig. 10 before the punches have really begun to perform their work at the prior stations.

As the punches come to their position taking charge of the blanks at the prior stations, the cylinder 95 simply moves down over the tube 94 compressing the spring 97 and as the punches have finished their movement in forcing the blanks into the dies of the preceding stations and the head 11 and ram 2 of the press again move upwardly, the knock-out pins of the prior stations start to remove the blanks from the dies but the tube 94 is still held in place by the spring 97 and holds the blank 93 at this pointing station in place until the block 99 reaches the top of the slot 98 of the tube 94 and carries the tube 94 upwardly. The spring 104ª then moves the arm 90 and the notched disc 88 upwardly a slight distance as is permitted by the recess 190, the bottom of which will engage the head 191 of the retainer bolt 104. By this means a "dwell" in the period of time the blank remains in this station is secured and the pointing and length trimming step is properly performed with the time period for the movement of the head for the punch and die operation. This mechanism is used in such cases where a nicely pointed blank is required and in such cases where the rough form of the point by the die is satisfactory, this pointing station may be dispensed with.

The foregoing description has been largely confined to the use of rod stock which is not drawn to exact diameter. Screw blanks, bolts, studs and the like can be formed in this machine from wire stock wherein the wire is previously drawn to a finished diameter. It then passes to the dies and is headed and formed and finally sized and the head trimmed in the same manner as herein disclosed for rod stock. By use of the wire stock, one or more of the forming stations herein described could be dispensed with but the method and mechanism are essentially the same for the use of either rod or wire stock and the slug is cut from the wire stock and passed to the successive and necessary forming stations and delivered from the machine in the same manner as heretofore described. Thus this invention is not restricted to use with rod stock and the appended claims not specifying rod stock should be read with such understanding.

It will be seen from the foregoing description that ordinary rod stock from the mills or wire stock may be fed into the machine and that the die and punch sets and pointing and trimming sets are all caused to perform and function upon the blank through the normal movement of the ram of the press and that these die and trimming mechanisms of each of the stations may be made of the desired or necessary shapes to form the desired blank and size of the blank, the stock being fed being of approximate diameter required to make the blank in each instance.

By forming the blanks of the ordinary rod stock I avoid the higher cost of use of what is known as wire stock which has been drawn to size and I have also avoided oiling of the blanks or the stock as it passes into the machine as is the general practice with the present day single purpose machines. All of the operations are performed through or by means of reciprocation of the ram in the ordinary manner of the punch and die operations and the work is so allocated at each of the stations that the time required for each step is approximately that required for each of the other steps. The extruding operation for instance is performed by these dies, a first and second extrusion and the final sizing. The work performed by the die sets is reduced over that required in the extrusion at one step and thus a longer life is secured and the time of operation is reduced. In association with such sets the transfer mechanism from the time the slug is cut until it is discharged from the machine is all automatically performed, the slug or blank being passed from station to station progressively through the die and punch sets and delivered from the machine in dry state for the threading operation.

It is believed also evident that the various objects of the invention are attained by the structure described and that the mechanism may vary somewhat from that of the preferred form shown without departing from the spirit and scope of the invention as is set forth in the appended claims.

I claim:

1. The method of forming screw blanks, bolts, studs and like parts from stock of greater cross sectional area than that of the body of the completed part, which consists in cutting slugs of the necessary length in succession from the stock, passing the slugs in succession through a series of forming stations in consecutive order at each of which a part of the forming operation is performed simultaneously with the severing of a slug from the stock to thereby completely form a blank each time a slug is cut from the stock.

2. The method of forming screw blanks, bolts, studs and like parts from rod stock of greater diameter than the required body diameter of the completed blank which consists in severing the required length of rod therefrom to form a blank and simultaneously with each cutting operation submitting the same consecutively to a series of forming operations to thereby progressively shape each slug to final form while severing the slug from the rod.

3. The method of forming screw blanks, bolts, studs and like parts from rod stock which consists in cutting slugs in succession from the rod of a length and diameter somewhat greater than that of the finished part, consecutively passing the same through a series of punches and dies operated simultaneously with the cutting operation to gradually shape the blank to final shape of the body and provide a head for the blank.

4. The method of forming screw blanks, bolts, studs and like parts from rod stock which consists in cutting slugs of the necessary length in succession from the rod, consecutively passing the slugs through a series of forming stations at each of which a portion of the work is performed simultaneously upon the several blanks once the stations have become provided therewith, the work at the several stations being so allocated that the work at any one station may be performed in approximately the same time interval as that at any other station and simultaneously with cutting of a slug from the rod and thus provide a finished blank each time a slug is severed from the rod.

5. Mechanism for forming screw blanks, bolts, studs and like parts from round stock comprising a feeding mechanism, a cutter for cutting a portion of the desired length from the rod stock to form a slug, a series of forming devices each adapted for the performance of a part of the work required in forming the completed blank, means for simultaneously operating the cutting and forming devices, and mechanism for automatically passing the slug from the cutter through each of the forming devices.

6. Mechanism for forming screw blanks, bolts, studs and like parts from round stock comprising a feeding mechanism, a cutter for cutting a portion of the desired length from the stock to form a slug, a series of aligned forming devices each adapted for the performance of a part of the work required in forming the completed blank, means for simultaneously operating the cutter and forming devices, and mechanism for automatically passing the slug from the cutter through each of the forming devices.

7. Mechanism for forming screw blanks, bolts, studs and like parts from rod stock comprising a stock feeding mechanism, a cutter for cutting slugs in succession from the stock of the length required for formation of the blank, a series of aligned forming devices each adapted for the performance of a part of the work required in forming the completed blank, means for operating the cutter and the devices simultaneously, and mechanism operating when the devices and cutter are in non-forming position to pass the slugs successively from the cutter through the series of forming devices in consecutive order whereby on each operation of the cutter and forming devices a completed blank is formed.

8. Mechanism for forming screw blanks, bolts, studs and like parts from rod stock comprising a rod feeding mechanism, a cutter for cutting slugs in succession from the rod in the length required for formation of the blank, a series of punches and dies, means for relatively moving the punches and dies, each companion punch and die of the series simultaneously performing a part of the work required in the formation of the completed blank, a pointing device, means for passing the slugs from the cutter through each of the said series of punches and dies and pointing device in consecutive order, said means including fingers engaging each of the slugs and blanks and transferring the same successively to the next forming device of the series, and means at the last device of the series for discharging the completed blank from the machine.

9. Mechanism for forming screw blanks, bolts, studs and like parts comprising in a single unit a head and a base, means for reciprocating the head in a vertical plane toward and from the base, means for feeding rod stock to the machine in successive steps during movement of the head away from the base, movement of the head toward the base severing a length of the rod stock to form a slug, means for varying the length of the stock to be fed at each reciprocation of the head, a series of spaced mechanisms carried by the head to be utilized in the forming of the blank and a series of complemental mechanisms carried by the base for cooperation therewith, the complemental mechanisms providing spaced forming stations each adapted to perform a portion of the work required to completely form the blank, and means operable by movement of the head away from the base for simultaneously transferring the slugs progressively from one forming station to the next.

10. Mechanism for forming screw blanks, bolts, studs and like blank parts in a punch press having a ram and a bed, comprising a head attachable to the ram, a cutter and a series of punches carried by the head, a base, a series of dies carried by the base in alignment with the punches, mechanism for feeding a rod step by step to provide the desired length to be cut therefrom for formation of the blank, said feeding mechanism operating to feed the rod as the ram moves upwardly and to cut the said portion of the rod therefrom as the ram moves downwardly thereby providing a slug, means for holding the slug in vertical position, a transfer mechanism operable through upward movement of the ram to engage the slug and position it over a die in alignment with the companion punch whereby on a succeeding downward movement of the ram the slug is forced into the die to partially extrude the same to the form, said transfer mechanism being operable on the said upward movement of the ram to engage the partially formed blank and pass the same to the next forming station of the series and to release the said partially formed blank as the punch engages the same to hold it in vertical position whereby further movement of the punch forces the partially formed blank into a succeeding die to further form the same, mechanism operating in like manner to pass the partially formed blank through the successive forming stations in the last of which the blank is completely formed for a subsequent threading operation, and means at the last of said forming devices for passing the completed blank from the machine.

11. Apparatus of the character described comprising in a single unit a head and a base, means for reciprocating the head relative to the base, the head and the base respectively having a series of complemental devices substantially in aligned spaced relation each adapted for the performance of a part of the work required in forming a blank from a slug of the desired length cut from round stock, a cutter operated by movement of the head toward the base to cut a slug from the stock, mechanism operated by movement of the head away from the base to transfer the slug from the cutting station to the various complemental forming mechanisms, said transferring mechanism including a series of gripper devices equal in number to the number of forming stations whereby at each upward movement of the head a slug is carried from the cutting station to the first forming station and the slugs at the forming stations each moved to the next of the series, and means at the last station of the series for receiving the completed blank, said means being of a character to deliver the formed blanks in succession from the machine.

12. Apparatus of the character described comprising in a single unit a head and a base, means for reciprocating the head relative to the base, means for feeding rod stock to the apparatus, a cutter having complemental parts on the head and the base, means for feeding stock of the proper length to position in respect to the cutter part on the base, whereby on successive operations of the head a slug of the desired length is cut therefrom, means for receiving the slug and holding the same in a vertical position, a series of punches carried by the head and a series of dies carried by the base, the dies of the base having the desired form to each partially form the blank by movement of the blank thereinto by the respective punches, means at one of the stations for finishing the point and determining the length of the finished blank, a transfer mechanism actuated by movement of the head toward and from the base to pass the slugs from station to station and to support the same in alignment with the respective forming devices until engaged thereby on the downward movement of the head, means actuated, as the blanks are engaged by the punches and sustained in position by contact of the slug therewith, to operate the transfer mechanism to release the slugs to the control of the forming devices, means operated by upward movement of the head to remove the partially formed blanks from each of the forming devices, means operating prior to the release of the blanks from the forming device to actuate the transfer device to again take control of the slugs and move the same in succession to the forming devices consecutively, and a receiver for the slugs at the last forming device of the series to which the completed blank is moved subsequent to the performance of the final work at said station, said receiver including a tube into which the completed blanks at the last station are successively moved to thereby cause the same to pass successively through the tube.

13. In apparatus of the character described, a head and a base, means for reciprocating the head relative to the base in a vertical plane, a cutter, the complemental parts of which are carried by the head and base, means for feeding rod stock to the cutter, means for causing operation of the feeding device by movement of the head away from the base, means for varying the length of stock fed to the cutter whereby slugs of predetermined length may be cut therefrom, means for receiving the slug and holding the same in vertical position, a series of punches and dies, the punches being carried by the head and the dies by the base, the complemental punch and die parts being aligned on a center line passing through the slug in the held position, the distance of the first punch and die from the slug being of the same distance as the several punch and die parts are spaced one from the other, the said series of complemental punch and die parts providing a series of forming stations and being so constructed and arranged that the work performed at any station may be performed in the time period for each reciprocation of the head whereby at each successive complete movement of the head toward and from the base a blank is completely formed, means operable by successive reciprocations of the head for transferring a slug from its held position successively through the series of forming stations, means actuated by movement of the head away from the base to remove the blanks at the forming stations from the complemental part to the base to position to be engaged by the transfer devices, and means for receiving the completed blank at the last station of the series and means for moving the completed blank thereto at the time of removal of the blanks from the forming mechanism carried by the base.

14. In apparatus of the character described in which a slug of rod stock of the desired length and diameter is moved successively through a series of closely associated forming devices, said apparatus including a reciprocable head and a base carrying complemental parts of the forming devices, a transfer mechanism consisting of a series of gripper arms each adapted to engage and hold a slug in vertical position and equal in number to the number of forming devices, a slide carrying said grippers, means connected with the head and with the slide whereby movement of the head moves the slide and carries the grippers therewith parallel with the aligned forming devices and at one side thereof, said slide including a means actuated to open the gripper jaws and move the same away from the forming stations to permit operation of the devices on the slug and during the forming operations moves the grippers a distance equal to the distance apart of the forming devices and at the completion of the said movement as to distance finally moves the grippers toward the slugs and to engagement therewith, movement of the head toward and from the base causing an automatic operation of the grippers to transfer the slugs from station to station, and means at the final station of the series for receiving the completed blank.

15. A machine of the character described comprising a cutter, means for feeding rod stock to the cutter in successive movements of the cutter, means for varying the length of the stock to be severed from the rod stock to thereby form a slug of predetermined length, a series of forming mechanisms providing stations at each of which a part of the work in the formation of the blank is performed, mechanism for transferring the severed slug to a forming station and from one forming station to the next simultaneously as the forming stations become filled, said forming mechanisms operating simultaneously with the cutter and completing the formation of the blank each time the cutter severs a slug from the stock, and means for discharging the completed blank from the machine each time a rod is fed to the cutter.

16. A machine of the character described adapted to be mounted in a punch press having a vertically movable ram and a bed, comprising a head attached to the ram and a base attached to the bed of the press, the head having one member of a cutter and the base a complemental member, a series of complemental blank forming devices carried respectively by the head and the base, each set of complemental devices being constructed to perform the work upon the blank by movement of the head toward the base, mechanism for feeding stock in predeterminable length to the cutter whereby at each operation of the head a slug is severed therefrom, means connected with the head for operation of the said feeding mechanism by upward movement of the head and ram, means for removing the parts from the forming mechanisms of the base as the head moves away therefrom, and means for transferring the slug successively through the forming mechanisms.

17. In apparatus of the character described, a series of dies and companion punches for shaping screw blanks and like parts to final diameter, a pointing mechanism for finishing the point comprising a rotary cutter, a reciprocating head for forcing the ends of the blanks simultaneously to the respective dies and to the cutter with the under side of the head of the blank at the pointing station a predetermined distance from the cutter, the cuter shaping the end and determining the overall length of the body from the under side of the head.

18. Apparatus for formation of screw blanks, bolts, studs and like parts, comprising a reciprocable head, a series of punches carried by the head, a stationary base, a series of dies carried thereby aligned with the punches, means for bringing slugs of the required length in succession to the punch and die sets in consecutive order whereby the body and head are formed and thereafter sized to exact diameter, a spring-pressed member carried by the head, a rotary cutter carried by the base in alignment therewith, means for moving the slugs in succession through the several punch and die stations and the cutter station, the spring-pressed element extending from the head a greater distance than the punches whereby, as the head is reciprocated, the spring-pressed member engages the blank at the cutting station and moves the end thereof to engagement with the cutter, means limiting the extent of movement of the said spring-pressed member by its spring, comprising a lug carried by the head and a way in the spring-pressed member in which the lug engages, said spring-pressed member engaging the blank prior to engagement of the punches with the respective blanks whereby the point is being trimmed at the cutting station as the punches begin forcing the blanks into their respective dies and on reverse movement of the head the said spring-pressed member is held in engagement with the blank at the cutting station by the spring until the said lug engages the opposite end of the slot just prior to the completion of the movement of the head away from the base, and a means for trimming the head of the blank to which the blank is passed subsequent to the cutting operation on each operating stroke of the head of the apparatus.

19. In apparatus of the character described, means for shaping screw blanks and like parts to final form for threading, comprising a series of forming dies and a complemental series of co-operative punches, a pointing mechanism including a cutter, a head forming mechanism, the said dies, pointing, and head forming mechanisms providing forming stations aligned in equi-distantly spaced relationship, a reciprocating head for forcing blanks into the respective dies, means for positioning blanks at each of the die, pointing, and head forming stations, means for moving a blank to cutting position with the cutter of the pointing mechanism as other blanks are caused to enter the dies by the punches and for continuing the cutting operation after the completion of the insertion of the blanks in the dies, and means for removing the blanks from each of the forming stations.

20. The method of making screw blanks, bolts, studs and like parts from rod stock of greater cross sectional area than that of the blank to be formed which comprises cutting sections of predetermined length successively from the rod stock to provide blanks and simultaneously with each cutting step passing previously provided blanks in succession through a series of forming steps to shape, point and head the same to final size and form of the head and body.

CLEMENT C. RICHARD.